US006598696B2

(12) United States Patent
Lucking et al.

(10) Patent No.: US 6,598,696 B2
(45) Date of Patent: Jul. 29, 2003

(54) DEVICE AND METHOD FOR PURGING TRAPPED AIR FROM A VEHICLE STEERING GEAR HOUSING

(75) Inventors: Donald Emmett Lucking, West Bloomfield, MI (US); James Richard Robertson, Walled Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/032,179

(22) Filed: Dec. 21, 2001

(65) Prior Publication Data

US 2002/0125062 A1 Sep. 12, 2002

(51) Int. Cl.[7] .................................................. B62D 5/06
(52) U.S. Cl. .......................................... 180/417; 60/453
(58) Field of Search .......................... 180/417; 114/150; 60/327, 453

(56) References Cited

U.S. PATENT DOCUMENTS 1,806,136 A * 5/1931 Weiss ......................... 280/773
3,958,420 A * 5/1976 Yokota ........................ 60/453
4,079,805 A * 3/1978 Rau ........................... 180/421
4,410,193 A * 10/1983 Howard ....................... 114/150
4,449,470 A * 5/1984 Rump ......................... 114/150
4,685,293 A * 8/1987 McBeth ....................... 60/327
5,350,223 A * 9/1994 Stewart, Jr. ................ 303/84.2
5,456,078 A * 10/1995 Goloff ......................... 60/327
5,503,098 A * 4/1996 Bohlin ....................... 114/150

* cited by examiner

*Primary Examiner*—Leslie D. Morris
*Assistant Examiner*—Daniel Yeagley
(74) *Attorney, Agent, or Firm*—Brinks Hofer Gilson & Lione

(57) ABSTRACT

The present invention involves a purge device for a steering gear assembly of a vehicle. The steering gear assembly includes a steering piston chamber having a piston moveably housed therein and having a hydraulic assist port formed on the steering piston chamber. The device comprises a purge channel in fluid communication with the hydraulic assist port and housed in the steering piston chamber. The purge channel extends to a channel opening positioned at a first portion in the chamber to purge trapped air from the chamber during operation of the steering gear assembly.

17 Claims, 2 Drawing Sheets

DEVICE AND METHOD FOR PURGING TRAPPED AIR FROM A VEHICLE STEERING GEAR HOUSING

BACKGROUND OF THE INVENTION

The present invention relates to a purge device for an automotive steering system and a method of purging trapped gases therefrom.

Hydraulic power assisted steering systems are known and have been widely used in the automotive industry. A typical steering gear housing includes a steering piston chamber and a rack moveably disposed in the chamber. The housing further includes a piston with two sides disposed on the rack and placed in the chamber between two hydraulic assist ports formed on the chamber. Each side faces one of the ports. Typically, pressurized hydraulic fluid, e.g., power steering fluid, is added to one side of the piston and drained from the other side of the piston via fluid lines in fluid communication with the ports. In some steering gear housings, the location of the ports relative to the top of the chamber permits gases, such as air, of lower density relative to the hydraulic fluid to undesirably accumulate at the top of the chamber portion during installation and operation of the steering system. Trapped air therein significantly degrades the dynamic performance of the hydraulic power assisted steering system principally due to its high compressibility relative to the hydraulic fluid in the system.

BRIEF SUMMARY OF THE INVENTION

The present invention generally provides a device and method for purging trapped gas from a piston chamber of a vehicle hydraulic steering system. A purge channel which extends from a hydraulic assist port formed on the chamber is disposed in the piston chamber. The purge channel, through which power steering fluid flows, has an opening disposed at a top portion of the chamber in which air or fluid of lower density relative to the power steering fluid becomes trapped during installation and operation of the steering gear assembly. The channel is in fluid communication with the top portion of the chamber. During installation of the steering system, gases such as air may become trapped therein as hydraulic fluid is initially introduced into the system. Moreover, during operation of the steering system, the channel receives air in the top portion of the chamber. Then, air is purged or vented therefrom and through the purge channel to facilitate the dynamic performance of the hydraulic steering system. This prevents the accumulation of air trapped in the top portion of the chamber.

These and other advantages, features and benefits of the invention will become apparent from the drawings, detailed description and claims which follow.

DETAILED DESCRIPTION OF THE INVENTION

Figures 1, 2:
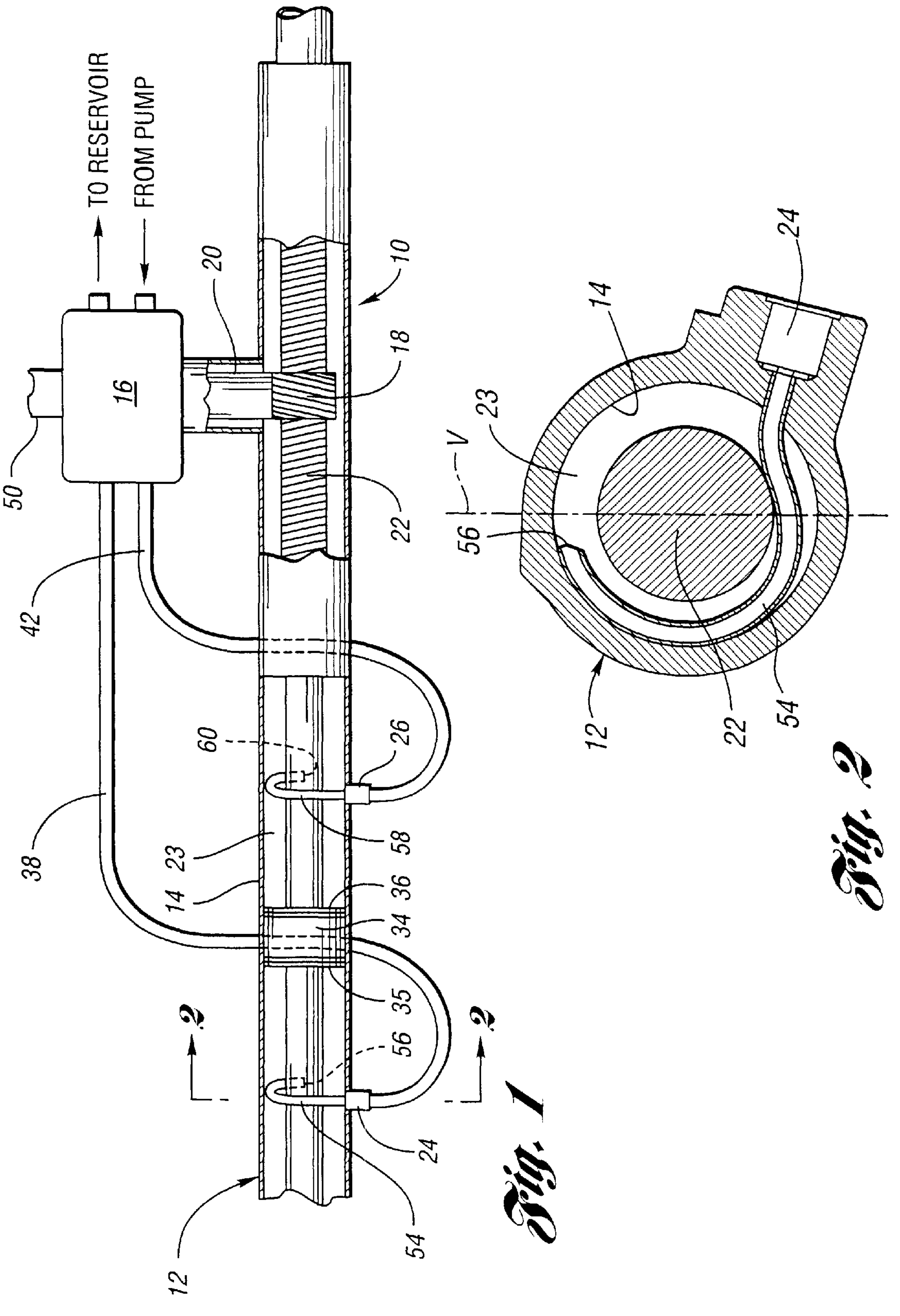
FIG. 1 is a front view of a steering gear assembly in which a purge device is disposed in accordance with the present invention.
FIG. 2 is a cross-sectional view of the steering gear assembly in FIG. 1 depicting a purge channel connected to a hydraulic assist port taken along lines 2—2.

FIG. 1 illustrates a vehicle steering gear assembly 10 having steering gear housing 12. In this embodiment, steering gear housing 12 is a power assisted steering rack and pinion gear housing. The steering gear housing includes a hydraulic control valve, e.g., rotary valve 16, to which steering shaft 20 is in communication. As shown, the rotary valve is in fluid communication with a fluid reservoir (not shown) and a fluid pump (not shown) which pumps fluid through the rotary valve to the chamber. Steering shaft 20 has pinion gear 18 engaging rack 22 as known in the art. As shown, housing 12 includes steering piston chamber or cylinder 14 through which rack 22 is moveably disposed. The chamber 14 has first and second hydraulic assist ports 24, 26 formed therealong (discussed below). Hydraulic assist ports 24, 26 provide fluid communication between rotary valve 16 and steering piston chamber 14 via first and second fluid lines 38, 42, respectively. Power steering fluid is supplied from the fluid pump through the rotary valve 16 and introduced into a high-pressure side of chamber 14 via the fluid lines based on a steering wheel input of the steering shaft 20 from a driver of the vehicle. Power steering fluid is also received in the reservoir from a low pressure side via the fluid lines based on the steering wheel input.

As shown in FIGS. 1 and 2, steering piston chamber 14 has a first portion or a top chamber portion 23 representing a top portion or an upper portion within steering piston chamber 14 relative to in-vehicle vertical line V. Chamber 14 further includes first and second hydraulic assist ports 24, 26 formed on the steering piston chamber 14 below the top chamber portion 23. Hydraulic piston 34 is connected to rack 22 and is moveably housed in steering piston chamber 14 between first and second hydraulic assist ports 24, 26. As shown, piston 34 has first and second sides 35, 36, each of which is adjacent one of the ports 24, 26. Each of the hydraulic assist ports 24, 26 is a port which allows hydraulic fluid, e.g., power steering fluid, under pressure to communicate with the hydraulic piston in a typical hydraulic steering system. The hydraulic piston actuates or assists in moving the steering gear to facilitate or affect a vehicle turn based on a steering wheel input. This is accomplished by having the rotary valve 16 introduce fluid on one of the sides 35, 36 of the piston 34 based on the input to move the piston in a direction toward the other of the ports 24, 26. The side on which the fluid is introduced may be termed a high pressure side, and the side toward which the piston is moved may be termed a low pressure side.

It is to be understood that the hydraulic fluid used in assembly 10 may be under pressure as known in the art. Although the high pressure side may include fluid between about 0–1200 pounds per square inch gauge (psig) and the low pressure side may include fluid between about 0–60 psig, any suitable pressure range may be included without falling beyond the scope or spirit of the present invention.

As shown in FIGS. 1 and 2, assembly 10 further includes first and second purge channels 54, 58, wherein each of the channels 54, 58 is connected to one of the hydraulic assist ports 24, 26 and housed in chamber 14 adjacent one of the sides 35, 36. As shown in FIGS. 1 and 2, each of the purge channels 54, 58 is disposed about rack 22 in the steering piston chamber 14. Each of the channels 54, 58 has a channel opening 56, 60, respectively, wherein each of the openings 56, 60 is positioned at the top chamber portion 23 to purge trapped fluid therefrom during operation of the steering gear assembly 10. Channels 54, 58 are in fluid communication with ports 24, 26, respectively, and top chamber portion 23 of chamber 14 so that trapped air therein is purged or vented when power steering fluid is introduced through channels 54, 58 during operation of steering gear assembly 10.

In this embodiment, the purge channels 54, 58 are flexible tubes attached to the respective hydraulic port and in fluid communication with the top chamber portion. The flexible tube may be attached to the respective hydraulic assist port by any suitable means. In this embodiment, the tube may be a discrete part and, thus, an installed member onto chamber 14. However, the channel may also be cast or drilled as an integral part of the steering gear housing. Thus, in another embodiment, purge channels 54, 58 may each be a tube which is integrally connected to the respective hydraulic assist port and in fluid communication with the top chamber portion.

Figure 3:
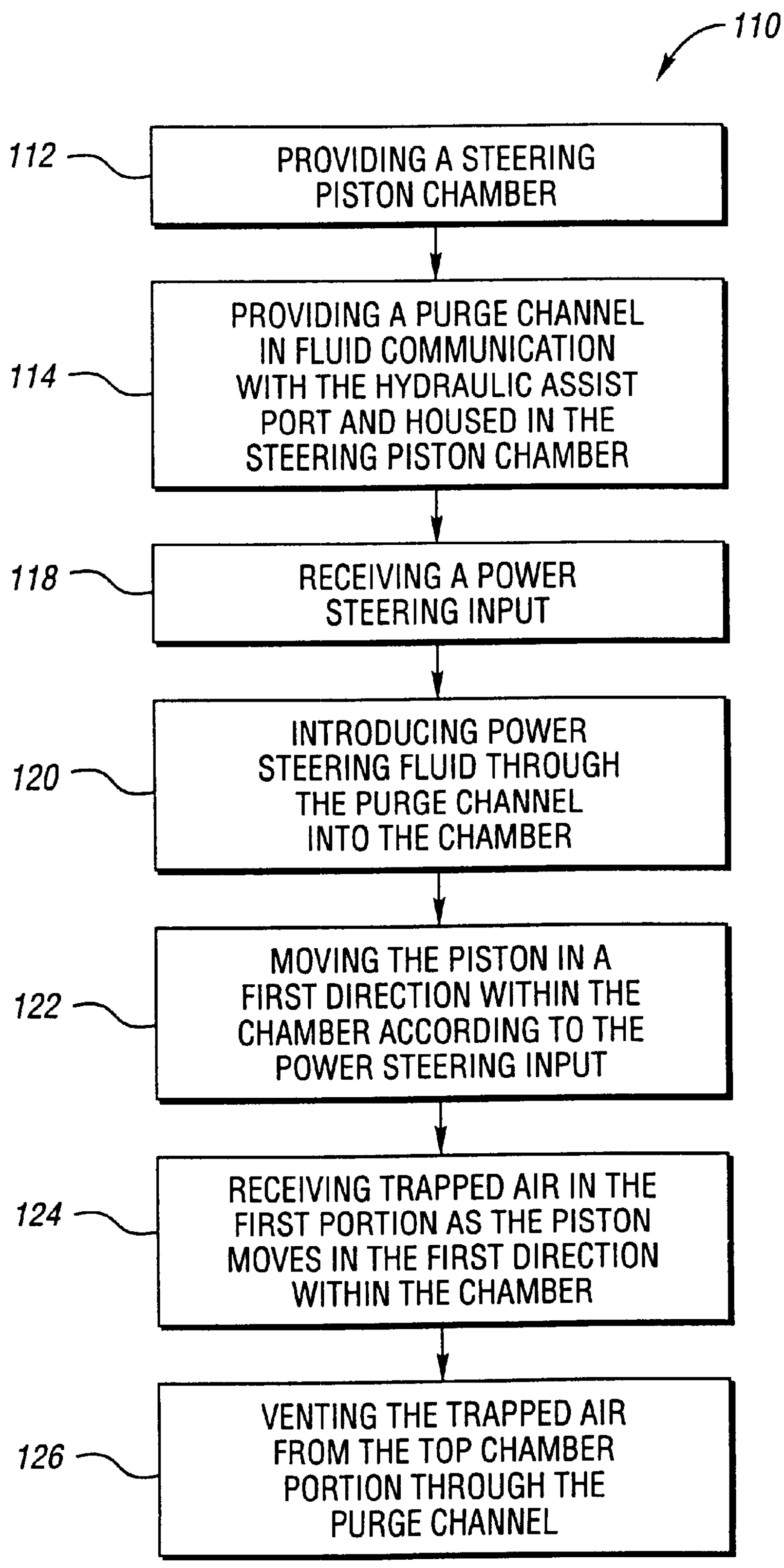
FIG. 3 is a flow chart showing one method of purging air from a steering gear assembly in accordance with the present invention.

FIG. 3 depicts one method of purging a second fluid, e.g., air, of lower density relative to the hydraulic fluid from a steering gear assembly (mentioned above) of a vehicle in accordance with the present invention. As shown, method 110 includes providing a steering piston chamber having a top chamber portion and a piston moveably housed in the steering piston chamber in box 112 as mentioned above. Method 110 further includes providing a purge channel which is in fluid communication with the channel and the top chamber portion in box 114. Due to gravity, air may lie over the hydraulic fluid in the top chamber. Method 110 further includes receiving a steering wheel input from a driver of the vehicle in which the steering gear assembly is operated in box 118, and activating a rotary valve in response to the input. As the driver of the vehicle turns the steering wheel defining the steering wheel input, the rotary valve introduces or directs high hydraulic pressure fluid into one of the fluid lines to be in fluid communication with the chamber. This line may be termed a high pressure fluid line. The rotary valve also routes the other of the fluid lines to remain in fluid communication with the reservoir to receive hydraulic fluid from the chamber. This line through which hydraulic fluid is received from the chamber may be termed a low pressure fluid line.

Hydraulic fluid is then introduced into the high pressure side of the steering piston chamber via the high pressure fluid line which actuates the steering gear based on the power steering input of the driver in box 120. Hydraulic fluid is also received from the low pressure side of the chamber to the reservoir via the low pressure fluid line. It is to be understood that other ways of introducing fluid to the chamber and fluid from the chamber would not fall beyond the scope or spirit of the present invention.

Then, the piston and rack are moved in a first direction or toward the low pressure side of the piston within the chamber to affect a vehicle turn according to the introduction of power steering fluid in box 122. Trapped air is then received on the low pressure side in the top chamber portion as the piston moves within the steering piston chamber in box 124. As air is received in the top chamber portion, the purge channel which is in fluid communication therewith purges or vents the air from the top chamber portion through the low pressure hydraulic line in box 126 to the reservoir where it is ultimately vented to the atmosphere, thereby preventing the accumulation of air in the chamber.

While the invention has been described in terms of preferred embodiments, it will be understood, of course, that the invention is not limited thereto since modifications may be made by those skilled in the art, particularly in light of the foregoing teachings.

What is claimed is:

1. A purge device for a steering gear assembly of a vehicle, the steering gear assembly including a steering piston chamber having a piston movably housed therein and having a hydraulic assist port formed on the steering piston chamber, the device comprising:

a purge channel in fluid communication with the hydraulic assist port and housed in the steering piston chamber, the purge channel extending to a channel opening positioned at a first portion in the chamber to purge trapped fluid from the chamber during operation of the steering gear assembly.

2. The device of claim 1 wherein the first portion is a top chamber portion from which trapped fluid is purged through the purge channel during operation of the steering gear assembly.

3. The device of claim 1 wherein the purge channel is a flexible tube attached to the hydraulic assist port and in fluid communication with the top chamber portion.

4. The device of claim 1 wherein the purge channel is a tube integrally connected to the hydraulic assist port and in fluid communication with the top chamber portion.

5. The device of claim 1 wherein the fluid includes air purged through the channel.

6. The device of claim 2 wherein the hydraulic assist port is a first hydraulic assist port formed on the steering piston chamber and adjacent one end of the piston.

7. The device of claim 6 wherein the steering piston chamber has a second hydraulic assist port opposite the first hydraulic assist port, the second hydraulic assist port being formed on the steering piston chamber adjacent an opposite end of the piston and below the top chamber portion.

8. The device of claim 7 wherein the device includes a second purge channel in fluid communication with the second hydraulic assist port and housed in the steering piston chamber, the second purge channel extending to a second channel opening positioned at a second portion in the chamber to purge trapped fluid from the chamber during operation of the steering gear assembly.

9. The device of claim 8 wherein the second portion is a top chamber portion from which trapped fluid is purged through the second purge channel during operation of the steering gear assembly.

10. The device of claim 8 wherein the second channel is a tube integrally connected to the second hydraulic assist port and in fluid communication with the top chamber portion.

11. The device of claim 8 wherein the second channel is a flexible tube attached to the second hydraulic assist port and in fluid communication with the top chamber portion.

12. A steering gear purge assembly for a vehicle to purge trapped fluid from the assembly, the assembly comprising:

a steering piston chamber having a top chamber portion and first and second hydraulic assist ports formed on the steering piston chamber below the top chamber portion;

a piston movably housed in the steering piston chamber between the first and second ports, the piston having a pair of ends each of which being adjacent one of the ports; and first and second purge channels each connected to one of the hydraulic assist ports and housed in the steering piston chamber adjacent one of the ends, each of the purge channels having a channel opening being positioned at the top chamber portion to purge trapped fluid therefrom during operation of the steering gear.

13. The assembly of claim 12 further comprising a rack to which the piston is movably attached, the rack being movably housed in the steering piston chamber of the vehicle.

14. The assembly of claim 13 wherein each of the purge channels is disposed about the rack in the steering piston chamber of the vehicle.

15. The assembly of claim 12 wherein the fluid includes air purged through the channels.

16. The assembly of claim 12 wherein each of the purge channels is a tube integrally connected to the respective hydraulic assist port and in fluid communication with the top chamber portion.

17. The assembly of claim 12 wherein each of the purge channels is a flexible tube attached to the respective hydraulic assist port and in fluid communication with the top chamber portion.

* * * * *